(12) United States Patent
Nelson et al.

(10) Patent No.: US 6,901,319 B1
(45) Date of Patent: May 31, 2005

(54) SYSTEM AND METHOD FOR CONTROLLING A GROUND VEHICLE

(75) Inventors: Frederick W. Nelson, Waukee, IA (US); Troy E. Schick, Cedar Falls, IA (US); Byron K. Miller, Waterloo, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/885,316

(22) Filed: Jul. 6, 2004

(51) Int. Cl.[7] ............................................. G06F 7/00
(52) U.S. Cl. ............................. 701/41; 701/42; 701/70; 303/139; 303/146
(58) Field of Search ........................... 701/1, 41, 42, 701/48, 70, 71, 72, 80, 74, 75, 213, 300, 301; 180/197, 411, 443, 446; 303/139, 140, 146, 147; 280/5.51, 703, 707, 211; 700/44, 45, 46, 63

(56) References Cited

U.S. PATENT DOCUMENTS

| | | | | |
|---|---|---|---|---|
| 5,742,918 A | * | 4/1998 | Ashrafi et al. | ................. 701/70 |
| 5,742,919 A | * | 4/1998 | Ashrafi et al. | ................. 701/70 |
| 5,809,434 A | * | 9/1998 | Ashrafi et al. | ................. 701/1 |
| 6,499,559 B2 | * | 12/2002 | Mc Cann et al. | ........... 180/446 |
| 6,658,342 B1 | * | 12/2003 | Hac | ............................. 701/70 |
| 6,671,595 B2 | * | 12/2003 | Lu et al. | ........................ 701/36 |
| 6,675,094 B2 | * | 1/2004 | Russell et al. | .............. 701/301 |

* cited by examiner

Primary Examiner—Richard M. Camby
(74) Attorney, Agent, or Firm—Suiter West PC LLO

(57) ABSTRACT

The present invention is a method for controlling a ground vehicle, for automated steering control of the vehicle or the like. The method of the present invention includes using a GPS receiver or the like and an inertial gyro or the like for providing automated steering control of the ground vehicle. A difference between a measured off-track error and a lateral error command is fed into a lateral error control loop, producing a lateral velocity command. Then, a difference between a measured lateral velocity and the lateral velocity command is fed into a lateral velocity control loop, producing a yaw rate command. Finally, a difference between a measured yaw rate, the yaw rate command, and a curved track yaw rate for the intended path of the vehicle is computed and fed into a yaw rate control loop, producing a valve command for steering the ground vehicle on or towards its intended path. Inputs such as measured wheel slip and the like are used to estimate the steering authority of the steered wheels of the vehicle; the estimated steering authority and/or the actions of a user driving the vehicle are used to adjust the gain of the yaw rate control loop.

20 Claims, 3 Drawing Sheets

SYSTEM AND METHOD FOR CONTROLLING A GROUND VEHICLE

FIELD OF THE INVENTION

The present invention generally relates to the field of automated steering control, and more particularly to a system and method for controlling a ground vehicle.

BACKGROUND OF THE INVENTION

A ground vehicle equipped for automated steering control may include a navigation control system coupled with a Global Positioning System (GPS) receiver assembly or the like. Data from the GPS receiver is used to determine an off-track error, for example, a measurement of the distance the vehicle has diverged from its intended track. A heading error is also determined as a measurement of a difference between the ground vehicle's measured heading and its intended direction. Finally, instrumentation may be provided for measuring a wheel angle for the vehicle. The off-track error, heading error, and wheel angle may be input to several nested proportional control loops, in combination with an integral controller on an outer loop, for providing automated steering control for the ground vehicle.

State of the art automated steering control systems are subject to several limitations. For example, the use of proportional control loops and a proportional integral control loop may not provide a robust solution over a wide range of vehicle speeds. The control loop utilizing vehicle heading information typically requires vehicle speed compensation. Additionally, those of ordinary skill in the art will appreciate that measured wheel angle is not a true indication of steering effectiveness, because of the effects of wheel slip, and the like. Consequently, it would be advantageous to provide a system and method for controlling a ground vehicle, such as for automated steering control of the vehicle, without requiring a measurement of the ground vehicle's wheel angle or the like which would be effective regardless of the vehicle's speed.

SUMMARY OF THE INVENTION

Accordingly, the present invention provides a method for controlling a ground vehicle, for automated steering control of the vehicle or the like. The method of the present invention may utilize a Global Positioning System (GPS) receiver assembly or the like to acquire positioning signals and generate navigation information including position (e.g., latitude and longitude), course or heading, speed, time, and the like. An inertial gyro, or the like coupled with the ground vehicle may determine a yaw rate for the vehicle through direct feedback. The yaw rate may be combined with data from the GPS receiver assembly for providing automated steering control of the ground vehicle.

The method of the present invention may include measuring off-track error for the vehicle. The off-track error is a measurement of a distance the ground vehicle has diverged from its intended path. A difference between the off-track error and a lateral error command may be fed into a lateral error control loop, producing a lateral velocity command for bringing the vehicle back to its intended path. Lateral velocity may also be measured. In one embodiment of the invention, the lateral velocity is determined by comparing an actual course measured for the vehicle to its intended course, in combination with a forward speed measured for the ground vehicle. In another embodiment, the lateral velocity may be differentiated by computing a change in the lateral error measurements per unit time or the like.

A difference between the measured lateral velocity and the lateral velocity command is fed into a lateral velocity control loop, producing a yaw rate command for steering the vehicle on or towards its intended path. A measurement of yaw rate for the ground vehicle may be effectuated. The yaw rate may be determined through direct feedback from an inertial gyro coupled with the vehicle or the like. Finally, a difference between the yaw rate, the yaw rate command, and a curved track yaw rate for the intended path of the ground vehicle is computed and fed into a yaw rate control loop, producing a valve command for steering the vehicle on or towards its intended path.

Inputs such as measured wheel slip, the draft of an implement conveyed by the vehicle, and the like are used to estimate the steering authority of the steered wheels of the vehicle. The estimated steering authority is used to adjust the yaw rate control loop to compensate for a loss of steering authority. The yaw rate control loop is also adjusted to reflect the actions of a user driving the vehicle. For instance, a user adjusting the gain using a user interface will augment the valve command determined in the yaw rate control loop, or a user turning a steering wheel of the vehicle will disengage the valve command.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
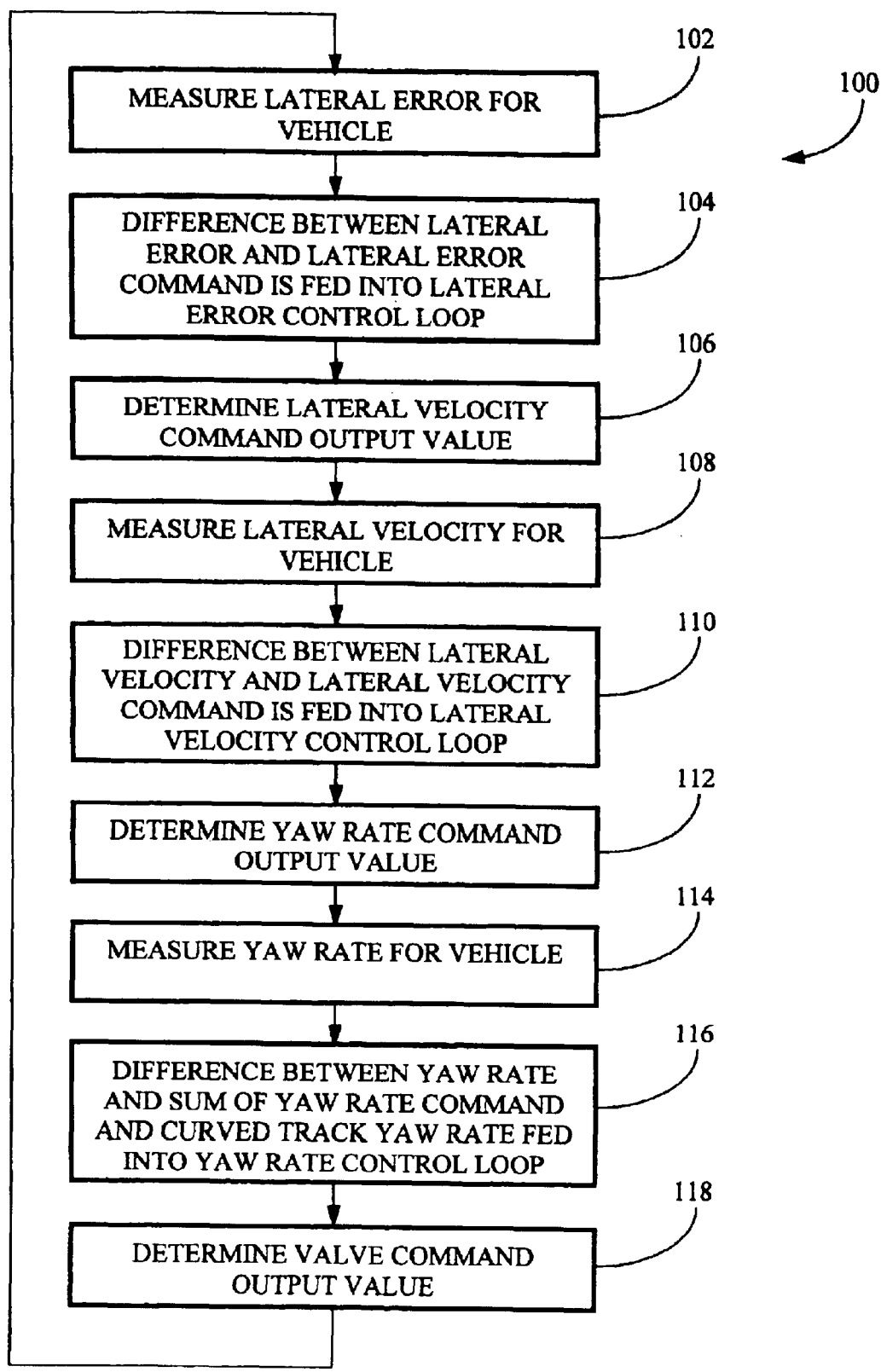
FIG. 1 is a flow diagram illustrating a method for controlling a ground vehicle in accordance with an exemplary embodiment of the present invention.
Figure 2:
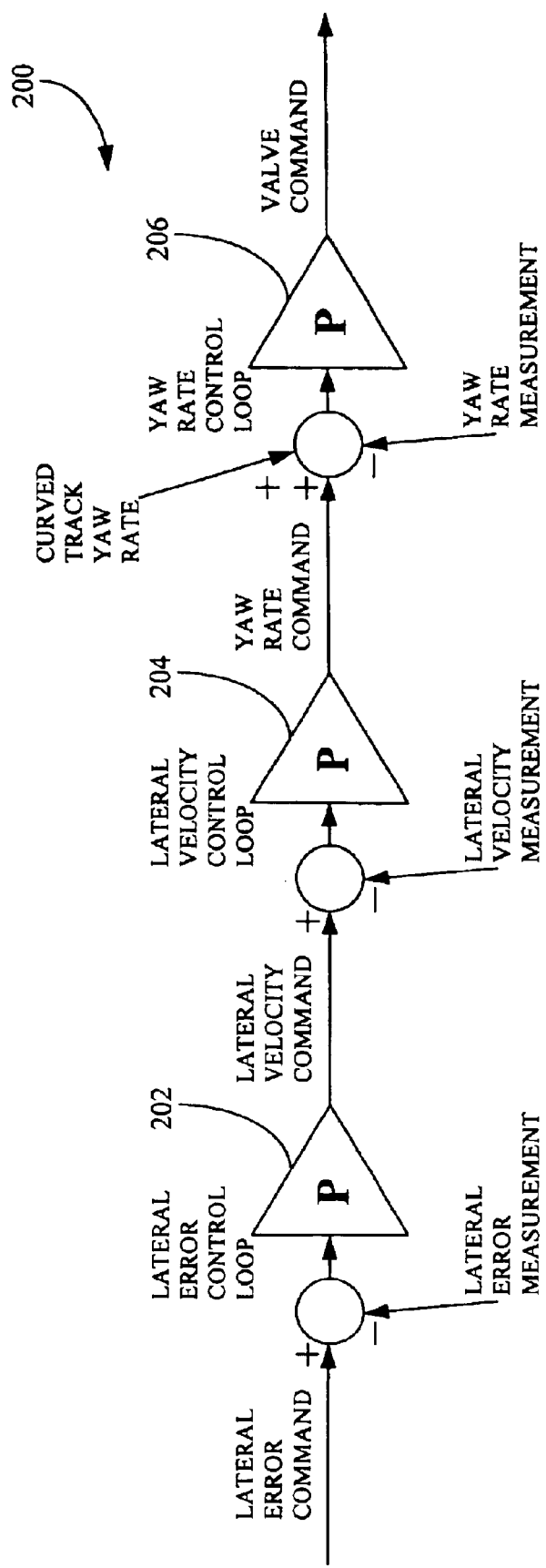
FIG. 2 is an illustration of an exemplary steering control algorithm including proportional gain control loops for implementing the method illustrated in FIG. 1.
Figure 3:
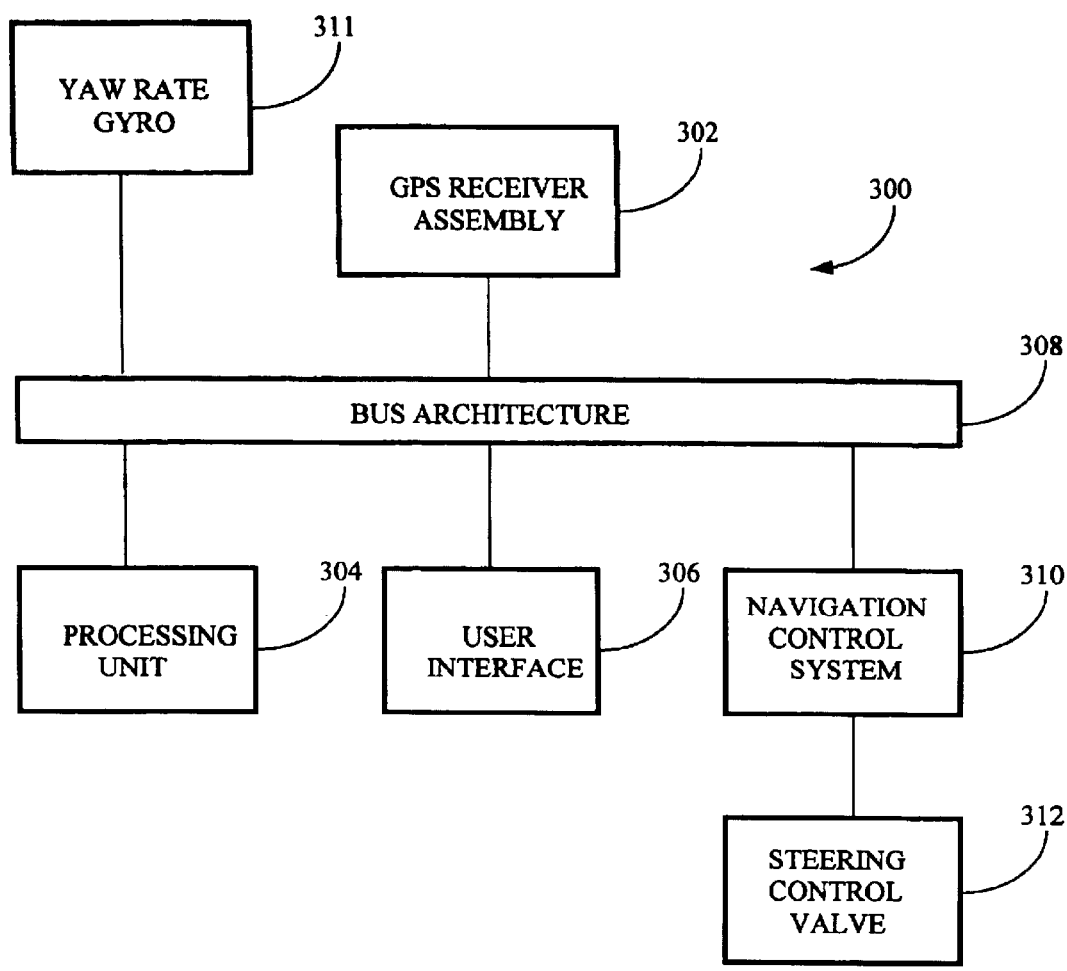
FIG. 3 is a system diagram illustrating a GPS system for use with the method described in FIG. 1.

Referring generally to FIGS. 1 through 3, a system and method for controlling a ground vehicle for providing automated steering control or the like in accordance with an exemplary embodiment of the present invention is described. In a first step of the exemplary method, a measurement of off-track error for the vehicle is taken. The off-track error is a measurement of a distance the ground vehicle has diverged from its intended path. Next, a difference between the off-track error and a lateral error command is fed into a lateral error control loop, producing a lateral velocity command for bringing the ground vehicle back to its intended path. The lateral velocity of the vehicle is measured. In one embodiment, the lateral velocity is determined by comparing an actual course measured for the ground vehicle to its intended course, in combination with a forward speed measured for the ground vehicle. In another embodiment, the lateral velocity may be differentiated using a series of lateral error measurements taken over time, by computing a change in the lateral error measurements per unit time or the like.

Next, a difference between the lateral velocity and the lateral velocity command is fed into a lateral velocity control loop, producing a yaw rate command for bringing the ground vehicle back to its intended path. The yaw rate of the vehicle is measured. The yaw rate may be determined through direct feedback from an inertial gyro coupled with the vehicle or the like. Finally, a difference between the yaw rate, the yaw rate command, and a curved track yaw rate for the intended path of the vehicle is computed and fed into a yaw rate control loop, producing a valve command for bringing the ground vehicle back to its intended path.

In exemplary embodiments of the present invention, inputs such as measured wheel slip, the draft of an implement conveyed by the vehicle, and the like are used to estimate the steering authority of the steered wheels of the vehicle. The estimated steering authority is used to adjust the yaw rate control loop to compensate for a loss of steering authority. The yaw rate control loop is also adjusted to reflect the actions of a user driving the vehicle. For instance, a user adjusting the gain using a user interface will augment the valve command determined in the yaw rate control loop, or a user turning a steering wheel of the vehicle will disengage the valve command.

Referring now to FIG. 1, a method 100 for controlling a ground vehicle using estimated steering authority and yaw rate inputs in accordance with an exemplary embodiment of the present invention is described. Referring to FIG. 2, a steering control algorithm 200 including proportional gain control loops 202 and 204, and variable gain proportional control loop 206 is provided as an embodiment of the exemplary method 100; however, those of ordinary skill in the art will appreciate that various other steering control algorithms may be used for controlling the ground vehicle, including steering control algorithms utilizing proportional integral control algorithms, proportional integral derivative (PID) control algorithms, and the like, without departing from the scope and intent of the present invention.

In step 102 of the exemplary method 100, a measurement of off-track error (lateral error) for the vehicle is taken. For instance, the lateral error may be a measurement of a distance the ground vehicle has diverged from its intended path in a direction substantially perpendicular to the intended path, determined by a GPS location measurement for the vehicle compared against a location measurement for its desired position on the intended path, or the like. In step 104, a difference between the lateral error and a lateral error command set point value is fed into a lateral error control loop, such as proportional gain lateral error control loop 202, for producing a lateral velocity command set point output value. For example, the difference between a lateral error for the ground vehicle of 10.0 centimeters and a lateral error command set point value of 0.0 centimeters is computed and found to be 10.0 centimeters. This difference of 10.0 centimeters is then fed into the proportional gain lateral error control loop 202. In step 106, a lateral velocity command set point value for bringing the ground vehicle back to its intended path is determined in the proportional gain lateral error control loop 202. Preferably, the lateral velocity command set point value is limited to 80% of the ground vehicle's speed, for limiting the ground vehicle from approaching a line of its intended course at too large an angle and passing over the line. For instance, a ground vehicle traveling at a speed of 5 miles per hour (mph) would be limited to a lateral velocity command set point value of 4 mph. Those of ordinary skill in the art will appreciate that the lateral velocity command set point value may comprise a different percentage of the ground vehicle's speed without departing from the scope and spirit of the present invention.

Next, in step 108, a measurement of lateral velocity for the vehicle is determined. In one embodiment of the present invention, the lateral velocity is determined by comparing an actual course measured for the ground vehicle to its intended course. In combination with a forward speed measured for the ground vehicle, the actual course and the intended course are used to compute the ground vehicle's lateral velocity. For example, an actual course measured for the ground vehicle at 30 degrees from its intended course, in combination with a forward speed measured for the ground vehicle of 5 mph, are used to compute a lateral velocity of 2.5 mph. In another embodiment, the lateral velocity may be differentiated using a series of lateral error measurements taken over time, by computing a change in the lateral error measurements per unit time or the like. In step 110, a difference between the lateral velocity measured in step 108 and the lateral velocity command set point value determined in step 106 is fed into a lateral velocity control loop, such as proportional gain lateral velocity control loop 204, for producing a yaw rate command set point output value. For instance, the difference between a lateral velocity for the ground vehicle of 3 mph and a lateral velocity command set point value of 4 mph is computed and found to be 1 mph. This difference of 1 mph is then fed into the proportional gain lateral velocity control loop 204. In step 112, a yaw rate command set point value for bringing the ground vehicle back to its intended path is determined in the proportional gain lateral velocity control loop 204. For example, a yaw rate command set point value of 10 degrees per second is determined in the proportional gain lateral velocity control loop 204.

Then, in step 114 of the exemplary method 100, a measurement of yaw rate for the vehicle is taken. For instance, the yaw rate may be determined through direct feedback from an inertial gyro coupled with the vehicle or the like. In step 116, a difference between the yaw rate, and a sum of the yaw rate command set point value determined in step 112 and a curved track yaw rate for the intended path of the vehicle, is computed and fed into a yaw rate control loop, such as a variable gain proportional yaw rate control loop 206, for producing a valve command set point output value. For example, the difference between a yaw rate for the ground vehicle of 8 degrees per second, and a sum of a yaw rate command set point value of 10 degrees per second and a curved track yaw rate for the intended path of the vehicle of 9 degrees per second, is computed and found to be 11 degrees per second. This difference of 11 degrees per second is then fed into the variable gain proportional yaw rate control loop 206. In step 118, a valve command set point value for bringing the ground vehicle back to its intended path is determined in the variable gain proportional yaw rate control loop 206.

In exemplary embodiments of the present invention, inputs such as measured wheel slip, the draft of an implement conveyed by the vehicle, and the like are used to estimate a steering authority for the steered wheels of the vehicle. For instance, by comparing a theoretical speed for the ground vehicle with a measured speed, the wheel slip of the vehicle may be calculated and used to determine an estimated steering authority or the like. The estimated steering authority may be utilized to adjust the gain of the variable gain proportional yaw rate control loop 206 to compensate for a loss of steering authority for the steered wheels of the vehicle. For example, increasing the gain of the variable gain proportional yaw rate control loop 206 will result in an increase in the steering aggressiveness of the steered wheels of the vehicle at higher wheel slip rates or the like. Preferably the gain of the variable gain proportional yaw rate control loop 206 is also inversely proportional to the forward speed of the vehicle, providing a control system which is tuned over a range of vehicle speeds. Those of ordinary skill in the art will appreciate that the gain of the variable gain proportional yaw rate control loop 206 is also adjusted to reflect the actions of a user driving the vehicle. For instance, a user adjusting the gain using a user interface or the like will augment the valve command set point value determined in the variable gain proportional yaw rate control loop 206, or a user turning a steering wheel of the vehicle will disengage the valve command.

Referring to FIG. 3, a GPS receiver assembly 300 for use with an exemplary method of the present invention is described. GPS receiver assembly 300 may be employed to measure off-track error (lateral error) of a ground vehicle as employed in method 100 of the present invention, described in FIG. 1. Further, GPS receiver assembly 300 may determine the lateral velocity by comparing an actual course measured for the ground vehicle to its intended course.

The GPS receiver assembly 300 includes a global positioning system receiver assembly 302, a processing unit 304, and a user interface 306 interconnected in a bus architecture 308. Processing unit 304 may include a processor and a memory. User interface 306 may include a visual display. In an embodiment of the invention, user interface may receive steering control information from a user. Additionally, user interface 306 may be implemented as a graphical user interface.

The global positioning system receiver assembly 302 receives positioning signals from a global positioning system and generates global positioning system based navigation information including position (e.g., latitude and longitude), course or heading, speed, time, and the like, for use by the processing unit 304 and other components of the GPS receiver assembly 300. In exemplary embodiments, the global positioning system receiver assembly 302 receives positioning signals from the Global Positioning System (GPS), a space-based radio-navigation system managed by the United States Air Force for the Government of the United States. However, it is contemplated that the global positioning system receiver assembly 302 may alternately be adapted for use with other radio based navigation/global positioning systems such as the GLONASS Navigation Satellite System managed by the Russian Space Agency (RSA) for the Russian Federation. Additionally, in embodiments of the invention, the global positioning system receiver assembly 302 may be capable of receiving and utilizing enhanced positioning information provided by differential GPS (DGPS) systems and wide area differential GPS (WADGPS) systems such as the STARFIRE™ WDGPS system developed by Deere & Company of Moline, Ill., the Wide Area Augmentation System (WAAS) provided by the Federal Aviation Administration of the United States Government, or the like. In such embodiments, the global positioning system receiver assembly 302 may include, or be coupled to, a radio receiver for receiving differential error correction information.

The global positioning system receiver assembly 302 and a navigation control system 310 are interconnected in the bus architecture 308. Navigation control system 310 may also operate according to yaw rate information received from a yaw rate gyro 311. For example, the navigation control system 310 may utilize the navigation information provided by the global positioning system receiver assembly 302 and yaw rate gyro 311 to furnish navigation or guidance information to the vehicle. The navigation control system 310 uses method 100 (FIG. 1) to control a vehicle steering controller, such as steering control valve 312 or the like, for steering the vehicle along its intended path. For example, in exemplary embodiments of the invention, the navigation control system 310 is capable of navigating and steering parallel paths or tracks through a field using a steering control algorithm, such as steering control algorithm 200 (FIG. 2) or the like. It is further contemplated that steering of a vehicle may be further controlled by a user through the user interface 306 or by a user turning a steering wheel of the vehicle as discussed in the steering control algorithm 200 of FIG. 2.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for controlling a vehicle, comprising:
   measuring a lateral error for the vehicle;
   feeding a first control loop with a difference between the lateral error and a lateral error command, producing a lateral velocity command;
   measuring a lateral velocity for the vehicle;
   feeding a second control loop with a difference between the lateral velocity and the lateral velocity command, producing a yaw rate command;
   measuring a yaw rate for the vehicle; and
   feeding a third control loop with a difference between the yaw rate, the yaw rate command, and a curved track yaw rate for the intended path of the vehicle, producing a command for steering the vehicle.

2. The method as claimed in claim 1, wherein the lateral error of the vehicle is measured by comparing an intended position of the vehicle with positional data received by a global positioning system (GPS) receiver assembly.

3. The method as claimed in claim 1, wherein the lateral velocity of the vehicle is measured by comparing an actual course for the vehicle to an intended course, in combination with a forward speed for the vehicle.

4. The method as claimed in claim 3, wherein the actual course for the vehicle is determined from data received by a global positioning system (GPS) receiver assembly.

5. The method as claimed in claim 3, wherein the forward speed for the vehicle is determined from data received by a global positioning system (GPS) receiver assembly.

6. The method as claimed in claim 1, wherein the lateral velocity of the vehicle is measured by calculating a change in a plurality of lateral error measurements per unit time.

7. The method as claimed in claim 1, wherein the yaw rate is measured through direct feedback from an inertial gyro coupled with the vehicle.

8. The method as claimed in claim 1, wherein the yaw rate is measured by calculating a change in a plurality of positional measurements received by a global positioning system (GPS) receiver assembly per unit time.

9. The method as claimed in claim 1, further comprising:
measuring a wheel slip rate for the vehicle and using the wheel slip rate to estimate a steering authority for steered wheels of the vehicle,
wherein the estimated steering authority of the steered wheels is used to adjust the gain of the yaw rate control loop.

10. The method as claimed in claim 1, further comprising:
measuring a draft rate for an implement towed by the vehicle and
using the draft rate of the implement to estimate a steering authority for steered wheels of the vehicle,
wherein the estimated steering authority of the steered wheels is used to adjust the gain of the yaw rate control loop.

11. The method as claimed in claim 1, further comprising measuring at least one input from a user of the vehicle, wherein the at least one user input is used to adjust the yaw rate control loop.

12. The method as claimed in claim 1, wherein the command for steering the vehicle is a valve command.

13. The method as claimed in claim 1, wherein the command for steering the vehicle is for steering the vehicle on its intended path.

14. The method as claimed in claim 1, wherein the command for steering the vehicle is for steering the vehicle toward its intended path.

15. The method as claimed in claim 1, wherein at least one of the first, second, and third control loops are proportional gain control loops.

16. The method as claimed in claim 1, where the third control loop is a proportional control loop having variable gain.

17. A system for controlling a vehicle, comprising:
a global positioning system (GPS) receiver for receiving a positioning signal from a global positioning system and generating a position for the vehicle;
a processing system for processing the position information to obtain navigation control system information;
wherein the navigation control system feeds a first control loop with a difference between a measured lateral error and a lateral error command, producing a lateral velocity command; feeds a second control loop with a difference between a measured lateral velocity and the lateral velocity command, producing a yaw rate command; and feeds a third control loop with a difference between a measured yaw rate, the yaw rate command, and a curved track yaw rate for the intended path of the vehicle, producing a command for steering the vehicle.

18. A method for controlling a vehicle, comprising:
measuring a lateral error for the vehicle;
feeding a first control loop with a difference between the lateral error and a lateral error command, producing a lateral velocity command;
measuring a lateral velocity for the vehicle;
feeding a second control loop with a difference between the lateral velocity and the lateral velocity command, producing a yaw rate command;
measuring a yaw rate for the vehicle; and
feeding a third control loop with a difference between the yaw rate, the yaw rate command, and a curved track yaw rate for the intended path of the vehicle, producing a command for steering the vehicle, wherein the lateral error of the vehicle is measured by comparing an intended position of the vehicle with positional data received by a global positioning system (GPS) receiver assembly and wherein the lateral velocity of the vehicle is measured by comparing an actual course for the vehicle to an intended course, in combination with a forward speed for the vehicle.

19. The method as claimed in claim 18, wherein the yaw rate is measured through direct feedback from an inertial gyro coupled with the vehicle.

20. The method as claimed in claim 18, wherein the yaw rate is measured by calculating a change in a plurality of positional measurements received by a global positioning system (GPS) receiver assembly per unit time.

* * * * *